Patented July 9, 1940

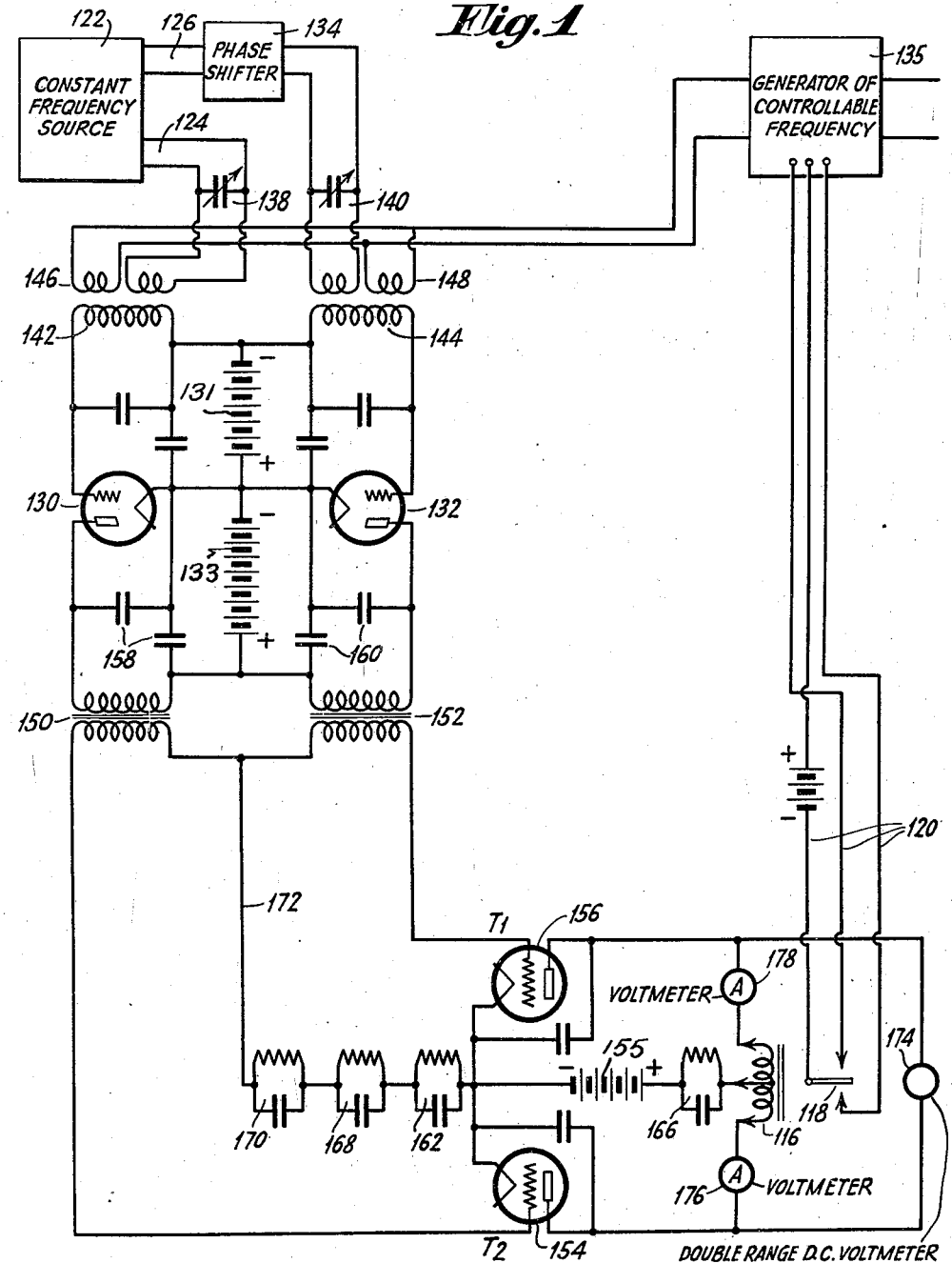

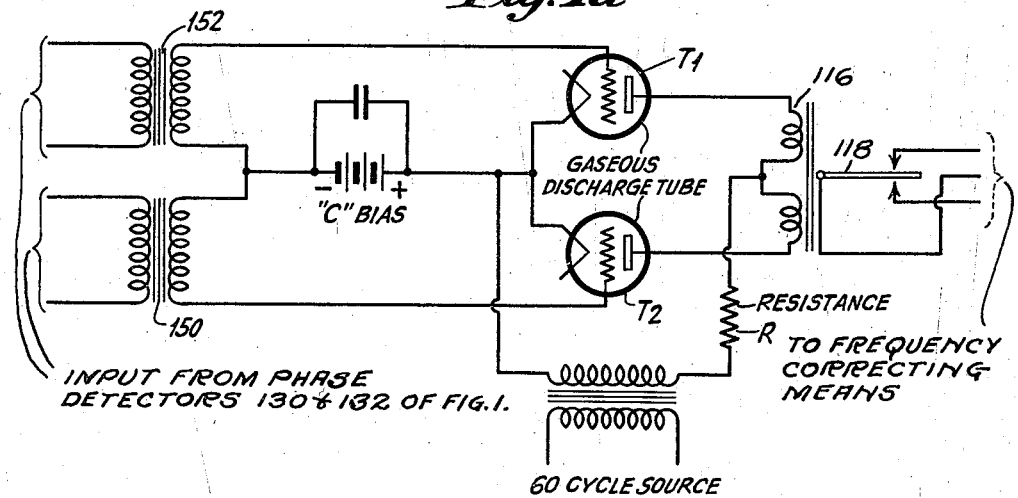
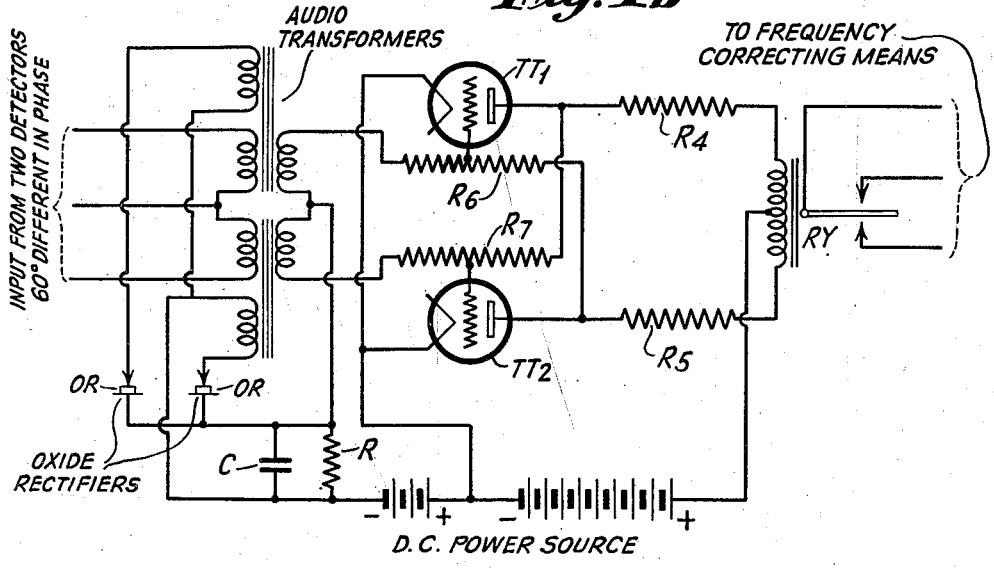

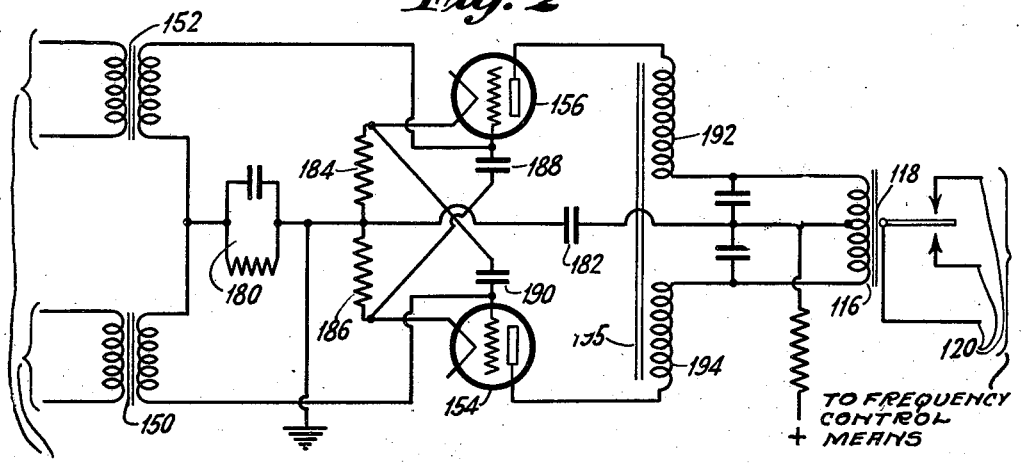
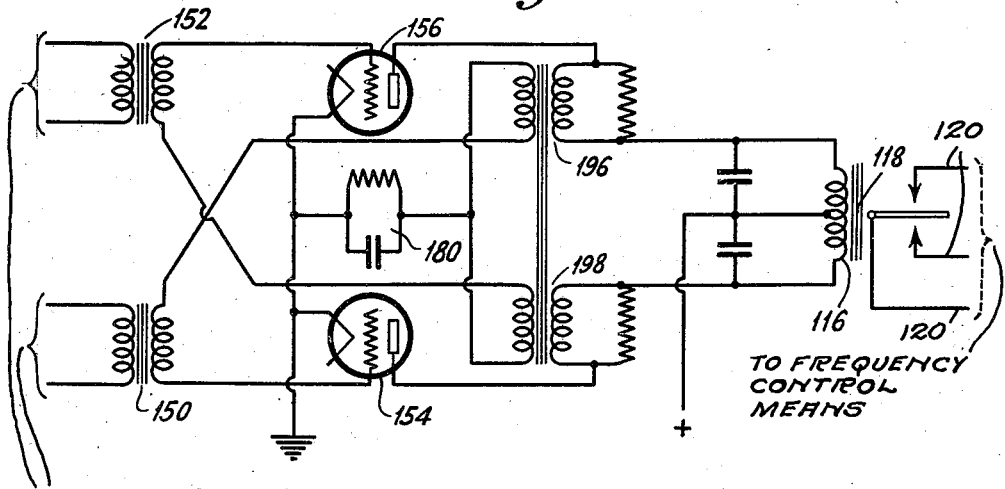

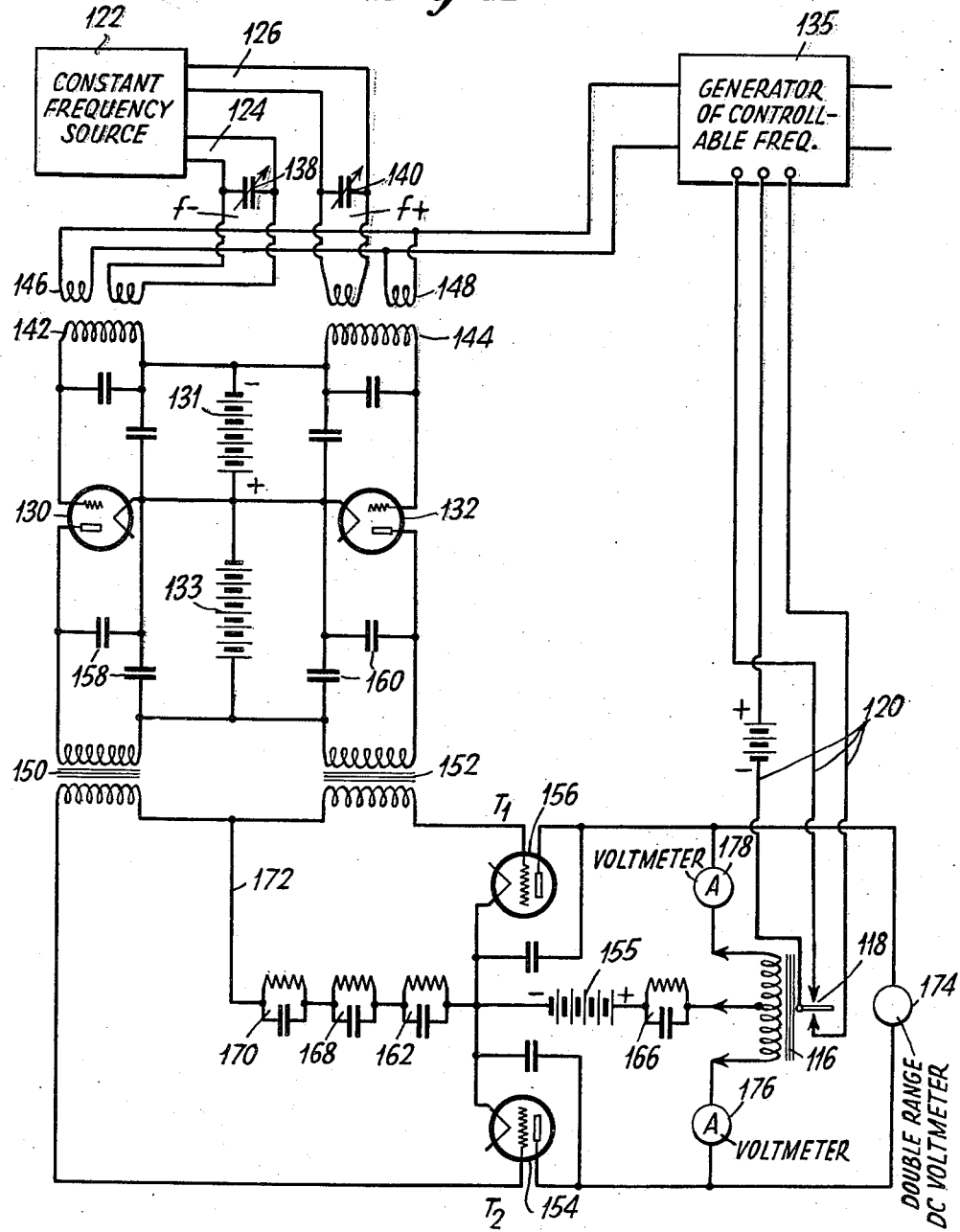

2,207,540

UNITED STATES PATENT OFFICE 2,207,540

METHOD OF AND MEANS FOR FREQUENCY COMPARISON AND MEASUREMENT

Clarence W. Hansell, Port Jefferson, N. Y., assignor to Radio Corporation of America, a corporation of Delaware Original application October 4, 1933, Serial No. 692,092. Divided and this application February 1, 1937, Serial No. 123,337

8 Claims. (Cl. 172—245)

This application is a division of my copending application Serial #692,092 filed October 4, 1933, now Patent #2,095,980.

For automatic frequency control it has been proposed heretofore to beat electrical current from a controllable frequency source against current from a constant frequency source. The resultant frequency differentiated current resulting from the beating action is passed through two filters in such a way that if the current, and consequently the controllable frequency, is of correct value, no potential difference will arise across the filter circuits. However, if the beat current shifts in frequency, the potential difference across the filters is utilized to vary the frequency of the controllable oscillator so that the oscillator is shifted in frequency in such a way as to produce the desired beat frequency. This system, however, suffers from the disadvantage that it is liable to produce the correct beat frequency note when the controllable oscillator is either above or below the desired frequency by the same amount. Consequently, with such an arrangement, confusion is likely to ensue since an operator cannot readily tell, with such an arrangement, whether or not he is operating above or below his constant frequency comparing wave. Therefore, a further object of my present invention is to provide a frequency correcting and controlling system which shall have only one possible frequency of operation.

In carrying out this angle of my present invention, I have discovered that the current obtained by beating waves of nearly the same frequency reverses in polarity or phase as the waves are passed through zero beat. This reversal of phase of the current obtained by beating energies of nearly like frequency as they are passed through zero beat is utilized to adjust the frequency of a controllable oscillator so as to stabilize its frequency of operation to produce a highly constant frequency wave.

In connection with the frequency control of an oscillation generator, it is to be noted that a certain amount of leeway is permissible and, in fact, it is desirable that an oscillation generator be not corrected in frequency for every slight change which may occur since this would tend to subject the correcting apparatus to incessant operation with its concomitant undue wear. A further feature of my improved frequency controlling system resides in the provision of an arrangement which does not become operative to exercise its frequency control until a drift in frequency of a predetermined amount has taken place.

Figure 1 is a schematic circuit diagram of a frequency control circuit which, for its operation, depends upon my novel teaching to the effect that as two oscillators are passed through zero beat, there is a reversal in phase of the resulting beat. Figure 4 is a modification of the arrangement of Figure 1. Figures 1a and 1b and Figures 2 and 3 are alternative circuits which may be used in the system illustrated in Figures 1 and 4.

Turning in greater detail to Figure 1, I have provided a constant frequency electrical current source 122 which may be a piezo-electric crystal controlled, and incidentally, temperature controlled oscillation generator so designed as to be substantially constant in frequency of operation. Since large power output is not essential the oscillator 122 may be relatively small and, consequently, inexpensive. The output from the crystal controlled source 122 is fed through two separate circuits 124, 126, to the input electrodes of two vacuum tube power detectors or rectifiers 130, 132. The grids of tubes 130 and 132 are biased as desired by source 131 connected between the grids and cathodes of said tubes. In one of the circuits 124, 126, and as illustrated, in circuit 126, there is provided a phase shifter 134 which may be a tuned circuit, a radio goniometer or an artificial transmission line. Obviously, the constant frequency source 122 may include frequency multipliers so that the output frequency corresponds in frequency to the frequency at which it is desired that the generator 135 of controllable frequency be operated.

Rather than use a phase shifter, such as that shown at 134, the two circuits 124, 126 may be tuned by condensers 138, 140 in which case the phase shift may be obtained by simply adjusting one circuit above and the other below the output frequency so that one carries the current of leading phase and the other carries lagging current with respect to the output voltage of the source 122. In this case the circuit between the constant frequency source 122 and detectors 130 and 132 may be as shown in Figure 4. The phase shift should preferably be made such that the current fed from circuits 124, 126 into the input circuits 142, 144 of the detectors differ by from 30 to 90 degrees.

To the detector input circuits 142, 144, there is also supplied from coils 146, 148 connected to the controllable source 135 energy from the controllable generator. The detectors 130, 132, therefore, produce in the low frequency transformers 150, 152, beats between energy from the constant frequency source 122 and the source 135 to be controlled. It is to be noted that source 135 is to be operated at substantially the same frequency as that of the output of the constant frequency controlling source 122.

The beat frequency outputs of the two detectors 130, 132, will have a phase relation corresponding to the difference in phase between the currents in the two radio frequency circuits which couple source 122 with the inputs to the two detectors 130, 132. If, for example, condensers 138, 140 are set to give a phase difference of 60 degrees between inputs from source 122 to the two detectors, then, in the outputs of the two detectors will appear beat frequency energy with a frequency equal to the difference between the frequencies of sources 122 and 135 and having a phase difference of 60 degrees.

The detectors, while shown of the bias type, are preferably in practice made to have grid leak resistors and condensers so as to eliminate the necessity of the grid biasing source. The anodes of detectors 130 and 132 are supplied with direct current from a source 133. The outputs of the detectors, namely, the energies appearing in the secondaries of transformers 150, 152, are applied to the input or grid filament circuits of two vacuum tubes 154, 156 having a common output circuit including the electromagnetically operated relay system 116, 118. Direct current potential for the anodes of tubes 154 and 156 is supplied by a source 155.

When the generator 135 of controllable frequency is operating at exactly the output frequency of source 122, the beats appearing in transformers 150, 152 will be of zero frequency and double the frequency of either of the sources 122, 135. The double frequency, however, will be shunted around the transformers 150, 152 by the action of by-passing condensers 158, 160 and the switch member 118 will not be moved in either direction. However, with a shift in frequency of 135 away from the output frequency of controlling source 122 the direct plate currents of the two vacuum tubes 156, 154 will be unequal due to the phase relations existing between their grid voltages and thus any inequality in the plate currents is utilized to operate the relay system 116, 118 which in turn may operate an alarm, or operate a reversible motor for automatically correcting the frequency of the controllable source. The principle upon which the system of Figure 1 operates may briefly be summarized by stating that as the generator 135 passes through zero beat, the phase relationship of the resultant beat frequency energies appearing in transformers 152, 150, reverse or shift from one polarity to another. This phenomenon, namely, reversal in phase of the beat as the frequencies combined pass through zero beat, is utilized to cause operation of the system to cause a return to zero beat condition and hence substantially identical frequency of operation of the controllable source with the controlling constant frequency source.

To understand the operation of the device shown in the figure, it should again be noted that the polarity of the beat frequency outputs from the two detectors is reversed as the transmitter frequency 135 is varied through zero beat with respect to the output of the crystal unit. Consequently, if the transmitter frequency is above the crystal frequency, one of the vacuum tubes, say 156, will have its grid swung positive in advance of tube 154 by an amount of time corresponding to the beat frequency and the phase relation between the two grid voltages. If the transmitter frequency is below the crystal frequency by a like amount, the polarities are reversed and, consequently, the grid of 154 is the first to swing positive instead of the grid of vacuum tube 156.

Under these conditions, it is only necessary to provide some method for making the direct plate current of one vacuum tube greater than that of the other in accordance with the phase relations between their grid voltages. One method of doing this involves the use of a condenser and resistance such as are shown at 162. Assume that the time constant of the condenser and resistance 162 is such that beginning at, say 100 cycles, the condenser begins to cause an appreciable smoothing out of the voltage variations across the resistance. Then the vacuum tube whose grid first swings positive will have grid rectification which will charge up the condenser and cause a negative potential to exist on the other tube at the time when it swings most positive. Assume, for example, that the phase relations between the two tubes is 60 degrees. Then if the excitation to 156 is leading in phase, 156 will have its grid potential positive once each cycle and 154 will follow at 60 degrees or one-sixth of a cycle later. It will then be five-sixths of a cycle before 156 again swings positive. Consequently, the time for the condenser to lose its charge after 156 swings positive, is only one-fifth as great as the time allowed for the charge to leak off during the time which elapses between 154 and 156 swinging positive. Consequently, tube 156 with its leading phase, will have an effective bias potential less negative than 154 and its plate current will consequently be greater than 154. If the polarities are reversed, 154 will be closely followed by 156 and there will be a relatively long time interval between positive peaks on 156 and 154 and, consequently, 154 will have a lower average bias potential and its plate current will predominate.

Thus, it may be seen that the time discharge rate of the condenser and resistance 162 in combination with the phase relations in the excitation between the two vacuum tubes, will give a differential plate current variation as the transmitter frequency is varied through zero beat with respect to the output of the crystal oscillator. If the beat frequency increases, the variations in potential across circuit 162 will tend to be smoothed out and reduced to smaller and smaller values. This would result in the differential variation decreasing at relatively high audio frequencies and would limit the maximum operating band in which the tube currents could be used to indicate in which direction the transmitter had varied. The frequency band may be increased by using a second resistance condenser circuit 166, connected in the plate circuit of the tubes. This circuit may be adjusted to have a different time constant than that of circuit 162. In this case it may be assumed that the condenser of circuit 166 begins to cause a lag in the potential across the resistance at a point where the audio frequency is so high that circuit 162 is beginning to lose its effect. In other words, the operating ranges of circuits 162 and 166 are made to overlap in such a way as to obtain almost twice as large an operating band as could be obtained with one circuit.

To still further widen the operating band, additional circuits of still different time constants such as 168, 170, may be serially connected in the common grid lead 172 and also in the plate circuit, in series with 166, if desired. In addition to the time constant circuits 162, 166, etc., the relay coil 116 may have considerable inductance and operate as an audio frequency auto transformer. This transformer action may be utilized to extend the differential action of the two tubes still further. For example, assume that the excitation to tube 156 leads 154 by 60 degrees. Then when tube 156 has its current increasing it will make the plate of 154 more positive, but this will not cause a current to flow in 154 because at this time its grid potential is still negative. However, at the time when the current in 156 is decreasing this will make the plate potential of tube 154 lower at a time when its grid is positive and the plate current will, consequently, be less in 154 than it otherwise would have been. Thus, the action of the time constant circuits and the transformer action of the relay all tend to cause the tube with the leading phase to have a higher plate current than the other tube. If the transmitter frequency moves through zero beat in such a way as to make the excitation to 154 lead that of 156, then 154 will have a predominating plate current and the relay will be reversed.

In order that the operator may have an indicator to show which way the frequency is varying before the relay has operated, a double range direct current voltmeter 174 may be connected across the relay coil. The direction of reading in this meter will then show whether the transmitter frequency is above or below the correct value. If preferred, two separate direct current meters 176, 178 may be used in series with the plate circuits of the two vacuum tubes, and further a bias source may be connected in series with lead 172 to make the tubes initially cut off. Deflection of either meter 176, 178 will indicate leading phase applied to its corresponding vacuum tube.

The motion of the relay 118 under the control of tubes 154 and 156 will serve to close one contact or another, to operate an alarm system or to run a small motor in one direction or another to correct the transmitter frequency.

To summarize the operation of the frequency controlling arrangement illustrated in Figure 1, it is to be remembered that source 135 is to be controlled or operated within quite narrow limits, at the same frequency as the frequency of oscillation of source 122. When both sources, namely, 122 and 135, are of the same frequency, there will be zero output from the detectors 130, 132 as a result of which there is either no current or uniform current flow through the tubes 156, 154 and the tongue 118 is not moved in either direction. Should generator 135 drift in frequency above that of source 122 the relative phases of the resultant beats from the two detectors will differ in one direction and should the generator 135 fall below in frequency with respect to the frequency of source 122, the phase of the resultant beats will differ in the opposite direction. That is, the polarity of the beat frequency output from the two detectors 130, 132 is reversed as the source 135 passes through zero beat with respect to the output of the crystal unit 122. Now, assuming that the beat in the secondary of transformer 152 leads in phase the beat in the secondary of transformer 150, tube 156 will be caused to draw more current first and incidentally impressing a negative voltage upon the condensers in the common grid circuit for both tubes 156, 154. A time later, when tube 154 is operated there will have been impressed, from the previous operation of tube 156, a negative potential on the grid of tube 154 as a result of which with a continuation of the condition just assumed, the mean current flow through tube 156 will be greater than that through tube 154. In other words, that tube of the two tubes 156, 154 which has the beat applied in leading phase, tends to rob the other tube of current causing the tube experiencing the leading phase excitation to draw a greater average current than the other tube. As shown in Figure 1, the greater current is caused to operate a relay tongue in one direction or another, in turn causing tuning means not shown to cause the generator of controllable frequency to be adjusted so as to return to a frequency corresponding exactly with the frequency of the constant frequency source 122 and so that there is substantially zero beat between the controllable source 135 and the controlling source 122 again.

It will, of course, be possible to make many modifications in the detail arrangements of Figure 1 for carrying out this important aspect of my present invention. For example, the detector tubes 130 and 132 may be of the grid leak type instead of the power type as shown. The output transformer for the detectors may be made of relatively low exciting reactance, if desired, so that the audio frequency outputs to the tubes 154 and 156 are kept small until the transmitter frequency has varied more than a predetermined amount. For example, it may be desirable not to make any correction of the transmitter frequency unless it varies more than 250 cycles from the correct value because this degree of control may be sufficient for communication purposes and to attempt to hold the transmitter any closer would result in unnecessary wear on the frequency correcting mechanism.

Also, in the diagram I have shown batteries for supplying anode and grid potentials whereas in actual practice, rectifiers or motor generators would commonly be used. It will also be apparent that for the sake of simplicity, I have omitted the circuits for supplying filament heating energy. In practice, the filament heating might be from either a direct current or an alternating current source and probably an alternating current source would be used.

In practice, I may combine the functions of tubes 154, 156 with those of 130, 132 by applying the condenser-resistance circuits 170, 168, 162, 166 and the relay coil 116 to the grid bias and anode supply circuits of the detector tubes 130, 132. I have shown two separate pairs of tubes in Figure 1, for carrying out the functions of radio frequency detection and audio phase detection, in order to make the scheme easier to comprehend. Obviously, combining both functions in one pair of tubes will result in economy in equipment.

In place of two ordinary vacuum tubes such as 154 and 156, I might use vapor electric devices sold under the name of "Thyratrons" or "Grid Glow Tubes." These devices, which are struck into action by grid excitation, but are extinguished only by reduction in plate voltage, are supplied with anode energy from a 60 cycle source with circuits such that the first tube to have its grid swung positive would become a short circuit for a half cycle of the 60 cycle energy and would short circuit the anode supply of the lagging tube to prevent it breaking down at all. In this case, the leading tube would carry rectified current and the lagging tube would remain an open circuit. Such a circuit has been illustrated in Figure 1a which shows "Thyratron" or grid glow tube circuits suitable for carrying out the same functions as tubes 154, 156 and their associated circuits in Figure 1. It should be noted that the circuits of Figure 1a are not limited in application to radio equipment, but may also be used in audio or power equipment to indicate phase relations. For example, in power generating stations the tube circuits may be utilized in performing most of the functions ordinarily performed by synchroscopes, even including the closing of circuit breakers to connect generators to the power system at the instant the generators have the same phase as the power system. A disadvantage, though not a very important one, of using vapor devices is that it would not be convenient to provide a voltmeter or other instruments to indicate to an operator the drift in frequency before the relay operated so that he might quickly make manual adjustments to prevent operation of the alarm or automatic correcting device.

In greater detail concerning Figure 1a, the beats to be compared are fed as before to the grids of vapor electric devices T₁, T₂. The tubes T₁, T₂ are biased by the "C" battery arrangement shown which may represent a source of rectified alternating current. Whichever tube is struck by leading phase grid potentials will cause an arc or glow discharge through either tube T₁ or T₂ and the voltage drop produced in the common plate resistance R will prevent current flow through the other tube as its grid swings positive a short time later. It is to be noted that in the system of Figure 1a, alternating current potentials are used for energizing the plate electrodes. This is done in order to periodically break the plate current through the tubes, otherwise, with direct current on the plates, and with one tube drawing current, that tube would no longer allow of desired operation as it would continue to keep the other tube extinguished even though, later on, leading voltages were applied to the other tube.

Still another very useful and practical circuit to detect phase changes is illustrated in Figure 1b. In Figure 1b, I have shown a tripping circuit, described by J. L. Finch in his U. S. Patent 1,844,950 which consists of a pair of multi-electrode vacuum tubes TT₁, TT₂, inter-linked by means of resistance coupling circuits R4, R5, R6, R7, in such a way that if either tube predominates in carrying plate current, it will cause the other tube to cut off and its own current to be a maximum. If this condition of current through a single tube is disturbed by momentarily forcing current to flow in the tube which had cut off and at the same time decreasing the flow of current in the tube which had been carrying current the unbalance is reversed, that is, the action of the two tubes is somewhat analogous to a snap switch the contacts of which can have only two definite positions and which is so designed that any intermediate positions are unstable and cannot be held for any appreciable time. By applying the phase displaced detector outputs to the two tubes, it is possible to cause these detector outputs to throw the unbalance of the tripping circuit back and forth. The output of one transformer can be used to cause one tube to take all the plate current while the output of the second transformer can be used to cause the second tube to take all the plate current. The phase displaced output from the two preceding detectors will cause first one tube and then the other to carry plate current, but the interval during which one tube draws current will be much greater than the interval during which the other tube draws current, depending upon whether or not the transmitter whose frequency is being monitored is above or below the frequency of the standard monitoring source. Due to the unbalance in time during which the tubes carry current there will be an unbalance in average direct current which can be utilized to operate the relay RY.

In practice, it is very desirable that the tripping circuit be made inoperative unless there is an output from the two detectors and unless the frequency of this output is above a predetermined value. I obtain such an action by normally biasing the two tripping tubes so highly that no plate current can flow in either of them and then overcome this bias or a portion of it by means of another direct current voltage obtained by rectification of a portion of the detector outputs. Thus, I have shown oxide rectifiers OR in the sketch to obtain the bucking voltage for the bias source. Since the amplitude of the bucking voltage is proportional to the amplitude of the audio output from the detectors the whole system is relatively insensitive to variations in volume of detector output. This is a desirable feature for practical applications where constant volume would be somewhat difficult to obtain. In the arrangement which I have shown it is only necessary for the volume to be sufficiently high to cause the tripping circuit to function. If either the standard frequency source or the transmitter should fail the tripping tubes are immediately rendered inoperative and no further changes are made in the adjustment of the transmitter frequency control equipment. Consequently, as soon as the failure or interruption of energy is corrected the transmitter frequency immediately comes again under the control of the correcting device and in no case has been run to the extreme range permitted by the frequency control. Also, if the device is used to monitor the output from a keyed transmitter, its operation is not affected by the keying except, of course, that the relay may tend to make contact intermittently if the keying is quite slow.

Further circuits for detecting the phase of the beat by comparing two like frequencies one of which tends to drift through zero beat, are illustrated in Figures 2 and 3. The circuits of Figures 2 and 3 illustrate means for increasing the speed of detection of the phase shift.

Turning to Figure 2 in greater detail, the input to the tubes 154, 156 corresponding to similarly labeled tubes in Figure 1, is derived from transformers 152, 150 in turn connected to detectors not shown corresponding to the detectors 130, 132 of Figure 1, one of the inputs in either transformer 152 or 150 is leading in phase depending upon whether the frequency to be monitored is above or below the standard frequency from the frequency controlling source. The condenser resistance circuit 180 and resistors 184, 186 and the feedback through condensers 188, 190 together with the action of transformers 192, 194 all tend to produce an unbalance in plate currents of the two vacuum tubes 154, 156. The current through one or the other tube predominates, of course, when the phase relations of the input from the detector output transformers 150, 152 reverses. The unequal plate currents then cause operation of the electromagnetic relay whose output leads 128 may be connected to any suitable alarm or frequency correcting device such as a frequency correcting motor.

The transformers 192, 194 of Figure 2 are wound upon one core 195 and so arranged that when current through the tube subjected to leading voltages is decreasing, the decreasing current causes an induced electromotive force in the other coil, tending to reduce the plate voltage on the tube experiencing the lagging input voltage. This tends to further rob the lagging tube of current and accentuate the unbalance caused by the phase shift of the beat.

In the phase detector and indicating system of Figure 3, the inputs from two radio frequency detectors such as 130, 132 of Figure 1 are fed into the transformers 150, 152 of Figure 3. As before the condenser-resistance combination 180 is charged first by that tube to which the leading phase currents are applied. The retained charge upon the condenser-resistance combination 180 therefore tends to reduce the current flow through the tube to which the beat is relatively lagging in phase. The transformers 196, 198 are so arranged and connected that as the plate current through that tube to which the leading phase voltages are being applied decreases, the induced electromotive force caused by the decrease in current is such as to reduce the voltage on the grid of the tube being subjected to the lagging beat. In this way the unbalance due to the leading beat is accentuated, causing quicker and more positive operation of the alarm or frequency correcting device relay 116, 118. In the arrangement shown in Figure 3 the grid connections to the transformers 196, 198 may be reversed so that leading voltages applied to one tube in effect cause the other tube to draw current and, hence, operate electromagnetic relay 116, 118.

I claim:

1. The method of comparing the relative frequency and phase of two alternating electrical currents of substantially the same frequency and of phases which may vary, which includes the steps of, combining electrical currents characteristic of one of said alternating electrical currents with phase displaced electrical currents characteristic of said other alternating electrical current to produce other phase displaced electrical currents, the relative phases of which other electrical currents reverse when the phase relation of said two alternating electrical currents changes and producing, when said other electrical currents exceed a predetermined substantial frequency, additional currents the directions of flow of which are characteristic of the relative phase of said other electrical currents and the intensities of which are characteristic of the phase displacement of said other electrical currents.

2. The method of comparing the relative phases and frequencies of two alternating electrical currents of substantially equal frequency, one of which currents may vary slightly in phase and frequency, which includes the steps of combining currents characteristic of both of said currents to produce a pair of phase displaced beat notes, and, producing, only after there has been a predetermined substantial relative change in frequency of said electrical currents, other currents the directions of flow of which indicate, the phase relation of the alternating electrical currents and the intensities of which indicate the extent of the phase displacement of the electrical currents.

3. The method of comparing the relative phases and frequencies of two high frequency alternating electrical currents of substantially the same frequency, one of which currents may vary in phase and frequency, which includes the steps of, combining and rectifying currents characteristic of each of said electrical currents to produce two beat notes, the relative phases of which beat notes vary in accordance with changes in relative phase and frequency of the high frequency alternating currents, said beat notes being produced only when the phase and frequency of said high frequency currents vary relative to each other by a substantial predetermined amount, producing two direct currents characteristic of the relative phases of said beat notes, and producing from said direct currents a resultant current, the direction of flow of which is characteristic of the relative phases of said beat notes and the intensity of which is characteristic of the extent of phase displacement of said beat notes.

4. In a system for comparing the relative phase and frequency of two high frequency electrical currents of substantially equal frequency, the relative phase and frequency of which may vary, means for deriving from each of said currents, currents relatively displaced in phase, means for producing from said currents relatively displaced in phase a pair of phase displaced beat notes the relative phase displacement of which is characteristic of the relative phases of said high frequency currents, and means operative only after a drift in frequency between said high frequency currents of a substantial predetermined value takes place, for producing indications of the relative phase displacements of said high frequency currents.

5. In a system for producing indications of the phase and frequency of a first source of alternating electrical current relative to the phase and frequency of a second source of alternating electrical current of known frequency which is of the same order of frequency as said first source, means connected with both of said sources for producing two phase displaced beat notes the phase relations of which reverse as the frequency relation of the said sources of alternating electrical current changes, means for producing two direct currents, the directions of flow of which are characteristic of the phase relation of the beat notes when the frequency of said beat notes exceeds a substantial value, and means for producing a resultant current from said two direct currents, the direction of flow of which is characteristic of the relative phases of said beat notes and the intensity of which is characteristic of the extent of phase deviation of said beat notes.

6. A system as recited in claim 5 including means for limiting the intensity of said direct currents to limit the indications produced by said resultant current so that they are linear for beat notes below a selected frequency and increase at a rate less than linearly for beat notes above said selected value.

7. In a system for comparing the phase and frequency of a first source of electrical current with the phase and frequency of a second source of electrical current of substantially like and constant frequency, means connected with both of said sources for producing phase displaced beat notes, the phase relation of which reverses as the phase relation of the electrical currents from said sources reverses, means for producing direct currents the directions of flow of which are characteristic of the phase relation of said beat notes, means for indicating the relative intensity of said direct currents to thereby indicate the relation of said phases, means for producing a resultant of said direct currents when the frequency of said beat notes exceeds a substantially predetermined substantial value, the direction of flow of which resultant is characteristic of the phase relation of the said beat notes, means for limiting the intensity of said direct currents to thereby limit the intensity of said resultant when the frequency of said beat notes exceed a selected value, and means for producing indications of said resultant.

8. In a system for comparing the frequency and phase of electrical current from a first source with the frequency and phase of electrical current from a second source of substantially the same and known constant frequency, a pair of electron discharge devices each having a control grid, a cathode, and an anode, means for applying current from said first source, the frequency of which may vary, to the control grids of said tubes, means for applying current from said second source of current of known and substantially constant frequency in phase displaced relation to the control grids of said tubes, means for biasing the control grids of said tubes relative to the cathodes of said tubes by voltages such that said tubes operate as rectifiers, transformer means coupled to the anode electrodes of said tubes, said transformer means being of low exciting reactance whereby the secondary windings thereof are energized only in the presence of beat notes above a predetermined frequency, a pair of thermionic discharge devices having their input electrodes coupled to said secondary windings and their output electrodes coupled to indicating means, and means connected with the input electrodes of said thermionic discharge devices for limiting the current in the output thereof when said beat notes exceed a predetermined selected frequency.

CLARENCE W. HANSELL.